(12) United States Patent
Velázquez et al.

(10) Patent No.: US 12,049,175 B2
(45) Date of Patent: Jul. 30, 2024

(54) SYSTEMS AND METHODS FOR SECURING CONDUITS IN VEHICLES

(71) Applicant: Nissan North America, Inc., Franklin, TN (US)

(72) Inventors: Julio Velázquez, Toluca (MX); Ricardo Colin, Toluca (MX); Francisco Martinez, Toluca (MX)

(73) Assignee: Nissan North America, Inc., Franklin, TN (US)

( * ) Notice: Subject to any disclaimer, the term of this patent is extended or adjusted under 35 U.S.C. 154(b) by 764 days.

(21) Appl. No.: 17/186,684

(22) Filed: Feb. 26, 2021

(65) Prior Publication Data

US 2022/0274541 A1 Sep. 1, 2022

(51) Int. Cl.
| | |
|---|---|
| *F16L 3/13* | (2006.01) |
| *B60R 16/00* | (2006.01) |
| *F16L 3/137* | (2006.01) |
| *F16L 3/237* | (2006.01) |

(52) U.S. Cl.
CPC ............... *B60R 16/00* (2013.01); *F16L 3/13* (2013.01); *F16L 3/137* (2013.01); *F16L 3/237* (2013.01)

(58) Field of Classification Search
CPC ... F16L 3/13; F16L 3/137; F16L 3/237; Y10T 24/3431; Y10T 24/3444; Y10T 24/344
See application file for complete search history.

(56) References Cited

U.S. PATENT DOCUMENTS

| | | | |
|---|---|---|---|
| 1,044,772 A * | 11/1912 | Gilbough | ................ F21V 21/08 24/339 |
| 3,698,992 A | 10/1972 | Armand | |
| 4,958,419 A | 9/1990 | Heckethorn et al. | |
| 5,715,579 A | 2/1998 | Beicht et al. | |
| 5,878,546 A * | 3/1999 | Westover | ................ E04C 5/167 24/336 |
| 7,241,071 B2 * | 7/2007 | Carraher | ................ E04C 5/163 52/719 |
| 7,367,363 B2 | 5/2008 | Friedline et al. | |
| 7,546,985 B1 | 6/2009 | Choi | |
| 7,997,542 B2 * | 8/2011 | Morello | .................... F16L 3/13 24/339 |
| 8,083,432 B2 * | 12/2011 | Limpert | .................... F16L 3/16 24/336 |
| 9,534,507 B2 | 1/2017 | Sauerhoefer et al. | |
| 10,668,878 B1 | 6/2020 | Sampson | |
| 2010/0116947 A1 * | 5/2010 | Winkler | ................. F16L 3/243 248/74.1 |

FOREIGN PATENT DOCUMENTS

| | | |
|---|---|---|
| CN | 203939568 U | 11/2014 |
| FR | 2741419 A1 | 5/1997 |
| JP | 4316342 B2 | 8/2009 |
| JP | 2009191879 A | 8/2009 |
| JP | 4583011 B2 | 11/2010 |

* cited by examiner

*Primary Examiner* — Robert Sandy

(74) *Attorney, Agent, or Firm* — Young Basile Hanlon & MacFarlane, P.C.

(57) ABSTRACT

A system is disclosed for use in securing one or more conduits in a vehicle. The system includes a clip that is configured for engagement with a first conduit and a tether that is configured for engagement with a second conduit, wherein the clip and the tether are rotatably engageable to facilitate rotation of the clip about an axis of rotation that extends in generally orthogonal relation to the first conduit (upon connection of the clip to the first conduit).

20 Claims, 4 Drawing Sheets

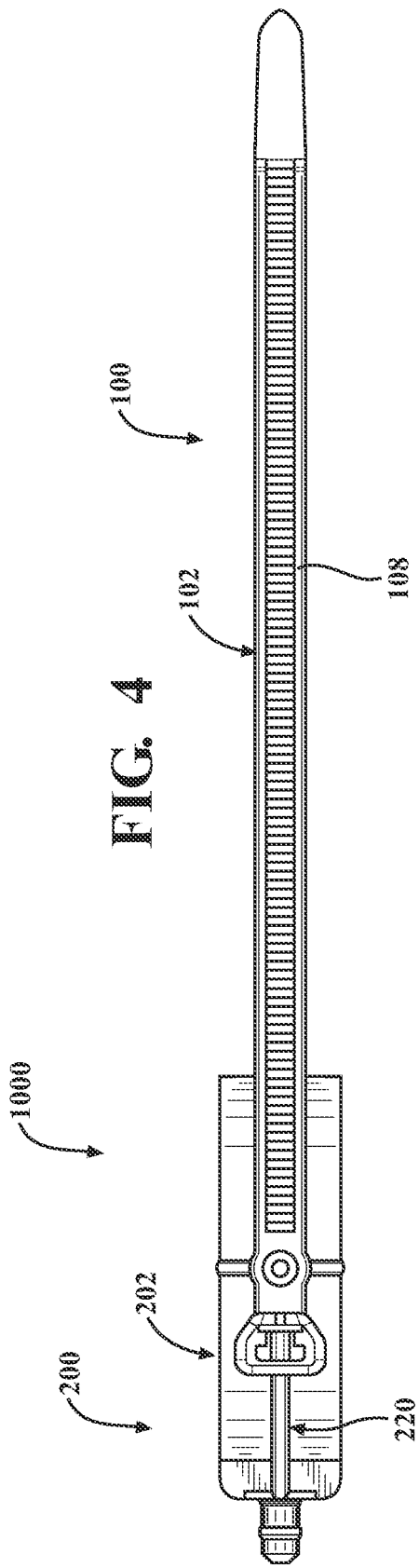
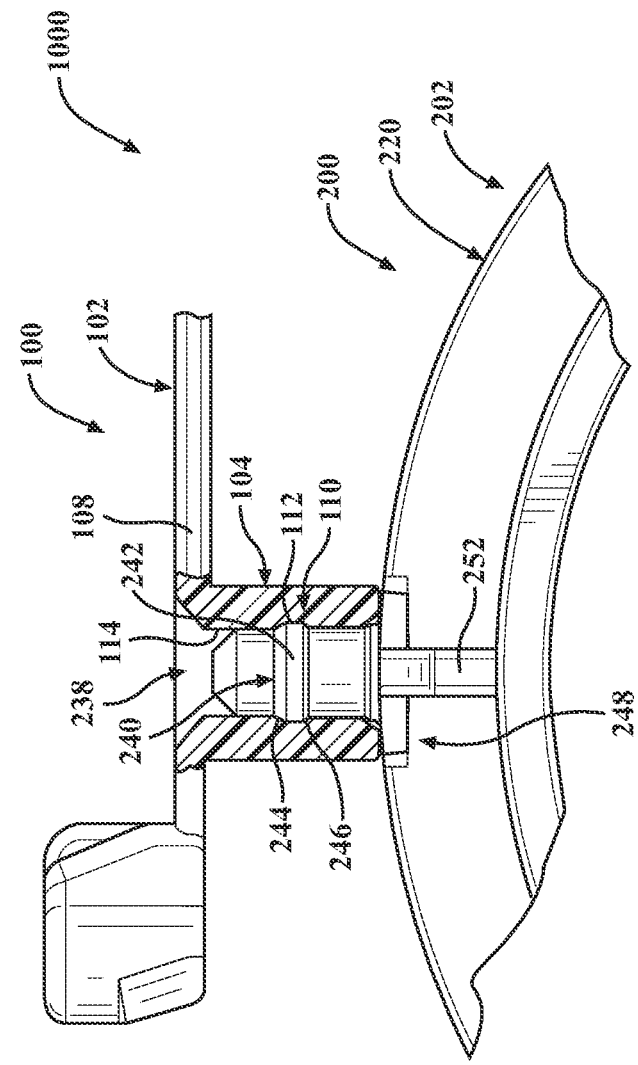
FIG. 4
FIG. 5

SYSTEMS AND METHODS FOR SECURING CONDUITS IN VEHICLES

TECHNICAL FIELD

The present disclosure relates to the securement of conduits in vehicles. More specifically, the present disclosure describes a rotatable clip that is configured to receive one or more conduits.

BACKGROUND

Many vehicles use clips to secure conduits, such as wiring harness(es), hoses, tubes, and other such elongated members, to improve organization, reduce wear, simplify maintenance, and/or separate the conduits from the engine to inhibit (if not entirely prevent) the engine from contacting the conduits (e.g., as a result of engine roll during acceleration). Known clips, however, offer limited workability and are sometimes subject to movement in relation to the conduit(s), which can result in difficulties during installation and/or excessive wear.

To address these concerns, the present disclosure describes a system including a rotatable conduit clip that simplifies installation and reduces wear on the conduit(s).

SUMMARY

In one aspect of the present disclosure, a system is disclosed for use in securing one or more conduits in a vehicle. The system includes a clip that is configured for engagement with a first conduit and a tether that is configured for engagement with a second conduit, wherein the clip and the tether are rotatably engageable to facilitate rotation of the clip about an axis of rotation that extends in generally orthogonal relation to the first conduit (upon connection of the clip to the first conduit).

In certain embodiments, the clip may include a stem that extends outwardly therefrom.

In certain embodiments, the tether may include a collar that is configured to receive the stem such that the stem is rotatable within the collar.

In certain embodiments the stem and the collar may be configured for releasable engagement such that the stem is connectable to the collar and disconnectable from the collar to thereby facilitate connection and disconnection of the clip and the tether.

In certain embodiments, the stem and the collar may be configured such that the clip is rotatable through an unlimited range of motion.

In certain embodiments, the clip may include a stabilizing arm that is configured for engagement with the first conduit to inhibit relative movement between the clip and the first conduit.

In certain embodiments, the stabilizing arm may define a length that is less than an inner transverse cross-sectional dimension defined by the clip.

In certain embodiments, the stabilizing arm may include a first end that is connected to a body of the clip and a free second end.

In certain embodiments, the stabilizing arm may be configured for deflection such that the stabilizing arm applies a force to the first conduit during connection of the clip to the first conduit.

In certain embodiments, the clip may include an appendage defining a bearing surface that is configured for engagement with the first conduit to thereby expand the clip during connection to the first conduit.

In certain embodiments, the appendage may define an axis that extends in non-orthogonal relation to the axis of rotation.

In another aspect of the present disclosure, a system is disclosed for use in securing one or more conduits in a vehicle. The system includes a clip having body defining a channel that is configured to receive a first conduit. The body is configured for rotatable engagement with a tether securable to a second conduit such that the clip is rotatable about an axis of rotation that extends transversely in relation to the first conduit.

In certain embodiments, the clip may further include a stabilizing arm that extends inwardly from the body.

In certain embodiments, the stabilizing arm may be configured to apply a force to the first conduit and thereby inhibit relative movement between the clip and the first conduit.

In certain embodiments, the stabilizing arm may be configured for deflection in relation to the body during connection of the clip to the first conduit.

In certain embodiments, the clip may further include a stiffener that extends from the body about a periphery thereof to resist deflection of the clip during connection to the first conduit.

In certain embodiments, the clip may further include a support that extends between the body and the stiffener and a base that is connected to the stiffener and the support to thereby inhibit off-axis movement between the clip and the tether.

In certain embodiments, the stiffener and the support may be oriented in (generally) orthogonal relation.

In certain embodiments, the clip may be unitary in construction.

In another aspect of the present disclosure, a method is disclosed for restricting movement between a first conduit and a second conduit in a vehicle. The method includes connecting a tether to the first conduit, rotating a clip in relation to the tether such that a channel defined by the clip extends in (generally) parallel relation to the second conduit, and connecting the second conduit to the clip to thereby secure the second conduit in relation to the first conduit.

In certain embodiments the method may further include connecting the clip to the tether.

In certain embodiments, connecting the clip to the tether may include inserting a stem extending from the clip into a collar on the tether such that the stem is rotatable within the collar.

BRIEF DESCRIPTION OF THE DRAWINGS

According to common practice, the various features of the drawings may not be to scale and may be arbitrarily expanded or reduced for clarity.

FIG. 4 is a top, plan view of the system shown with the clip connected to the tether.

FIG. 5 is a partial, longitudinal (vertical) cross-sectional view of the system illustrating connection of the clip to the tether.

DETAILED DESCRIPTION

Figure 1:
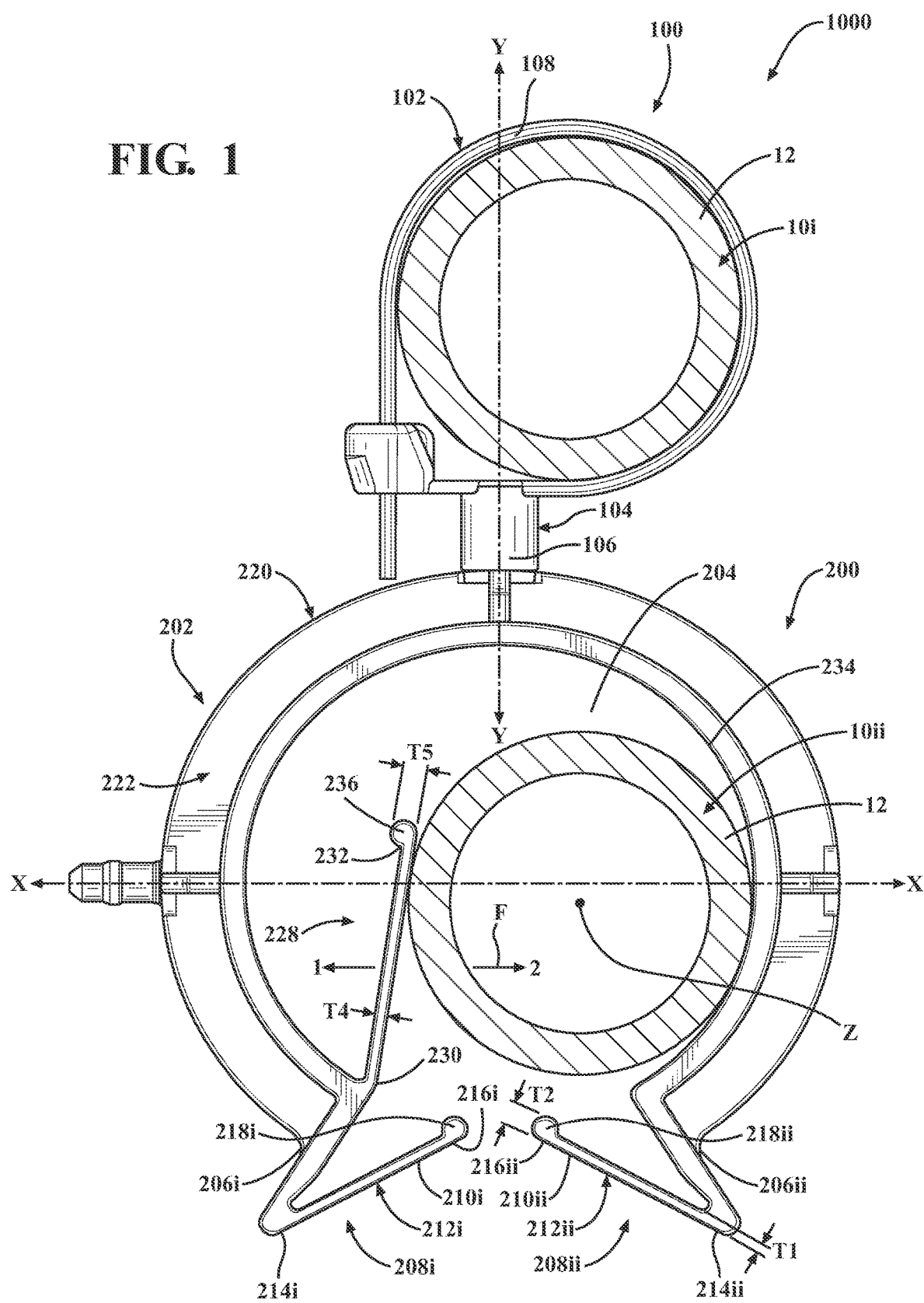
FIG. 1 is an end, plan view of a system including a clip and a tether for use in securing one or more conduits in a vehicle according to the principles of the present disclosure.
Figure 2:
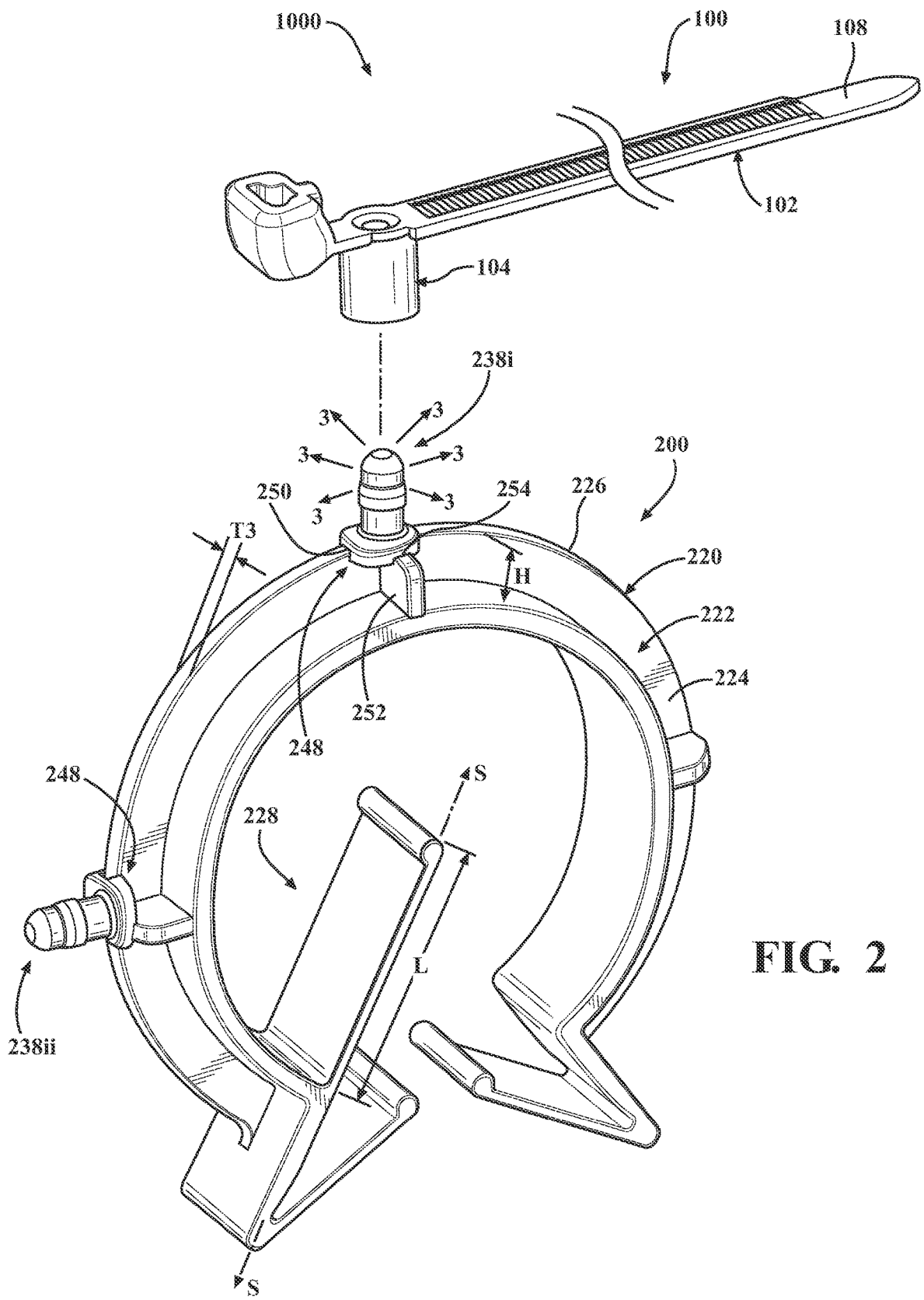
FIG. 2 is an end, perspective view of the system shown with the clip separated from the tether.
Figure 3:
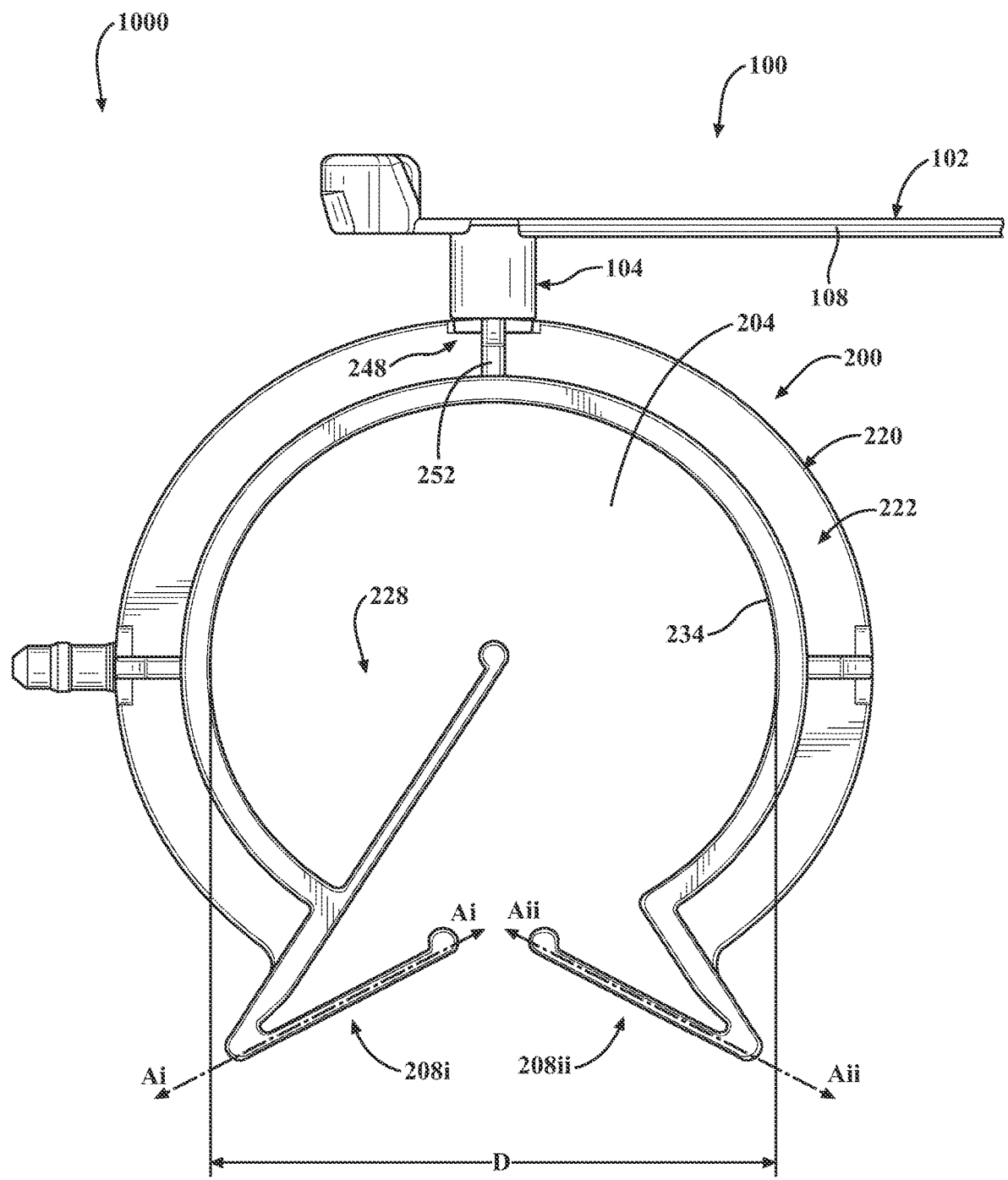
FIG. 3 is an end, plan view of the system shown with the clip connected to the tether.

Throughout the present disclosure, terms such as "support," "secure," "mount," "engage," "contact," and "connect" (and variations thereof) may be used interchangeably and should each be understood as referring to a physical interface between the pertinent structures and/or components.

The present disclosure describes a system for use in securing one or more conduits in a vehicle. The system includes a clip that is engageable with a first conduit (or other such component or structure in the vehicle) and a tether that is engageable with a second conduit (or other such component or structure in the vehicle) so as to inhibit (if not entirely prevent) relative movement between the clip and the first conduit and/or relative movement between the first and second conduits themselves. The clip and the tether are rotatably engageable such that the clip is rotatable about an axis of rotation that extends transversely (e.g., (generally) orthogonally) in relation to the first conduit, which improves the range of motion of the clip and, thus, workability to simplify installation (e.g., by allowing for single-handed connection of the clip to the first conduit).

To inhibit (if not entirely prevent) relative movement between the clip and the first conduit, in certain embodiments, the clip includes a stabilizing arm that extends into engagement with the first conduit, thereby reducing wear (e.g., abrasion) on the clip and/or the first conduit that may otherwise occur.

FIGS. 1-5 illustrate the presently disclosed system, which is identified by the reference character 1000. As described in detail herein below, the system 1000 is configured to secure one or more conduits 10 in a vehicle, e.g., to improve organization, reduce wear, simplify maintenance, and/or separate the conduit(s) 10 from the engine to inhibit (if not entirely prevent) the engine from contacting the conduits (e.g., as a result of engine roll during acceleration).

The system 1000 includes a tether 100 that is configured for engagement with (securement to) one or more (first) conduits 10$i$ (FIG. 1) and a clip 200 that is configured for engagement with (securement to) one or more (second) conduits 10$ii$. Although (generally) illustrated and described herein as wiring harnesses 12, it should be appreciated that the particular configuration and/or functionality of the conduits 10 may be varied without departing from the scope of the present disclosure. For example, it is envisioned that the conduits 10 may include (or may be configured as) one or more hoses, tubes, or other such elongated members, or as any other suitable operational or structural component(s) in the vehicle. Additionally, while the tether 100 and the clip 200 are each illustrated and described in connection with a single conduit 10 that includes a (generally) annular (e.g., circular) transverse cross-sectional configuration, it should be appreciated that the number of conduits 10 and/or the particular configuration of the conduits 10 may be varied without departing from the scope of the present disclosure. For example, it is envisioned that the tether 100 and/or the clip 200 may be configured for connection to a plurality (bundle) of conduits 10.

The tether 100 includes a body portion 102 that is engageable with the (first) conduit 10$i$ and a collar 104 (e.g., a bushing 106) that is connected to (extends from) the body portion 102. In the particular embodiment illustrated, the body portion 102 of the tether 100 is configured as a zip-tie 108. It should be appreciated, however, that the particular configuration of the tether 100 may be varied in alternate embodiments without departing from the scope of the present disclosure (e.g., depending upon the particular configuration of the conduit 10$i$).

While the body portion 102 and the collar 104 are illustrated as being fixedly connected (e.g., heat-staked together, integrally formed, etc.), embodiments are also envisioned in which the collar 104 may be configured for removable connection to (releasable engagement with) the body portion 102 of the tether 100 to allow for disconnection and reconnection of the body portion 102 and the collar 104 as needed. As such, the present disclosure contemplates embodiments in which the clip 200, the body portion 102, and the collar 104 may be configured as separate, discrete components of the system 1000.

The clip 200 may include (e.g., may be formed from) any suitable material or combination of materials. For example, it is envisioned that the clip 200 may include (e.g., may be formed partially or entirely from) one or more flexible (e.g., resilient) non-metallic materials (e.g., one or more plastics, polymers, composites, carbon fiber, etc.) and/or one or more flexible (e.g., resilient) metallic materials (e.g., aluminum, steel, etc.). The clip 200 includes a body 202 defining a channel 204 with an inner transverse cross-sectional dimension D (e.g., a diameter) that is configured to receive the (second) conduit 10$ii$ such that the conduit 10$ii$ extends along a (first) axis Z. As described in further detail below, the clip 200 is rotatable about a (second) axis of rotation Y that is transverse in relation to the channel 204 and the axis Z along with the conduit 10$ii$ extends (when secured to the clip 200). Although illustrated as being arranged in (generally) orthogonal relation, it should be appreciated that the relative orientations of the axes Y, Z may be varied in alternate embodiments of the disclosure by alerting the particular configuration of the clip 200. As such, embodiments are also envisioned herein in which the clip 200 may be configured such that axes Y, Z are arranged in non-orthogonal relation.

The body 202 includes an arcuate (e.g., a (generally) C-shaped) configuration defining opposing ends 206$i$, 206$ii$. The ends 206$i$, 206$ii$ include corresponding appendages 208$i$, 208$ii$ that extend inwardly from the body 202. More specifically, the appendages 208$i$, 208$ii$ are angled towards the channel 204 along axes Ai, Aii (FIG. 3) that extend in non-orthogonal relation to the axis of rotation Y so as to define bearing surfaces 210$i$, 210$ii$, respectively. In the particular embodiment illustrated, the appendages 208$i$, 208$ii$ are (generally) identical and are configured such that the axes Ai, Aii each subtend an angle with the axis of rotation Y that lies substantially within the range of (approximately) 30° to (approximately) 60° (e.g., (approximately) 45°), which guides the conduit 10$ii$ into the channel 204 during connection to the clip 200, as discussed in further detail below. It is envisioned, however, that the particular configurations of the appendages 208 may be varied in alternate embodiments without departing from the scope of the present disclosure (e.g., depending upon the particular configuration of the conduit 10$ii$). As such, angles outside the aforementioned range are also contemplated herein.

In the particular embodiment of the disclosure illustrated, the clip 200 includes a pair of appendages 208 that are configured as feet 212$i$, 212$ii$. Embodiments including a single appendage 208, however, are also envisioned herein. The feet 212$i$, 212$ii$ respectively include first ends 214$i$, 2146$ii$ that are connected to the ends 206$i$, 206$ii$ of the body 202 and free second ends 216*i*, 216*ii* defining contact members 218*i*, 218*ii* with a radiused (curved) configuration. As seen in FIG. 1, for example, the feet 212 define a (first) transverse cross-sectional dimension (e.g., a thickness) T1 between the ends 214, 216 and the contact members 218 define a (second) transverse cross-sectional dimension (e.g., a thickness) T2 that exceeds the transverse cross-sectional dimension T1, which serves to not only increase the strength of the appendages 208, but the surface area available for contact with the conduit 10*ii* (e.g., to reduce wear on the conduit 10*ii*).

The bearing surfaces 210*i*, 210*ii* are configured for engagement (contact) with the conduit 10*ii* such that the clip 200 expands laterally outward along an axis X (FIG. 1) that is (generally) orthogonal in relation to the axes Y, Z to facilitate insertion of the conduit 10*ii* into the channel 204. To increase the strength and rigidity of the clip 200, in certain embodiments, such as that illustrated throughout the figures, the clip 200 includes a stiffener 220 that is configured to resist deflection of the clip 200 during connection to the conduit 10*ii* and impart further resiliency to the clip 200 to assist in restoration of the clip 200 to its normal (non-expanded) configuration upon complete insertion of the conduit 10*ii* into the channel 204. The stiffener 220 extends radially outward from the body 202 about a periphery thereof and includes an arcuate (e.g., a (generally) C-shaped) configuration corresponding to that defined by the body 202. More specifically, in the illustrated embodiment, the stiffener 220 is configured as a flange 222 that includes (generally) planar front and rear (first and second) surfaces 224, 226 (FIG. 2) and defines a height H and a transverse cross-sectional dimension (e.g., a thickness) T3 that is less than the height H. While the stiffener 220 is illustrated as extending between the opposing ends 206*i*, 206*ii* of the body 202 in the particular embodiment seen throughout the figures, it should be appreciated that the particular configuration of the stiffener 220 may be varied in alternate embodiments without departing from the scope of the present disclosure (e.g., to vary the stiffness of the clip 200). For example, it is envisioned that the stiffener 220 may be configured such that the height H and the thickness T3 are (generally) equal and/or that the stiffener 220 may be shortened so as to extend along only a portion of the periphery of the clip 200.

In certain embodiments, such as that illustrated throughout the figures, the clip 200 further includes a stabilizing arm 228 that extends into the channel 204 from the end 206*i* of the body 202. Embodiments devoid of the stabilizing arm 228, however, would not be beyond the scope of the present disclosure (e.g., to simplify manufacture of the clip 200, reduce costs, etc.).

The stabilizing arm 228 defines a length L (FIG. 2) that is less than the inner transverse cross-sectional dimension D defined by the body 202 of the clip 200 (e.g., the channel 204) and an axis S. The axis S extends in non-orthogonal relation to the axis of rotation Y such that the axes S, Y subtend an angle that lies substantially within the range of (approximately) 30° to (approximately) 60° (e.g., (approximately) 45°). The length L and/or the relative orientations of the axes S, Y may be varied in various embodiments of the disclosure, however, to accommodate dimensional variation in the conduit 10*ii*, thereby increasing universality of the clip 200 by facilitating use of the clip 200 with a wide variety of conduits 10*ii*. For example, depending upon the particular configuration of the conduit 10*ii*, the present disclosure envisions embodiments in which the inner transverse cross-sectional dimension D and the length L may be (approximately) equivalent and/or embodiments in which the angle subtended by the axes S, Y may lie outside the aforementioned range.

The stabilizing arm 228 is configured for engagement (contact) with the conduit 10*ii*, as described in further detail below, and includes respective first and second ends 230, 232. The first end 230 is connected to the body 202 in a manner that allows for outward deflection (e.g., flexing, pivoting) of the stabilizing arm 228 in the direction indicated by arrow 1 (FIG. 1) during insertion of the conduit 10*ii*, whereby the stabilizing arm 228 applies a force F to the conduit 10*ii* in the direction indicated by arrow 2. The force F applied to the conduit 10*ii* by the stabilizing arm 228 not only facilitates retention of the conduit 10*ii* within the channel 204, but inhibits (if not entirely prevents) relative movement between the clip 200 and the conduit 10*ii* to reduce wear (e.g., abrasion) that may otherwise occur by urging the conduit 10*ii* into engagement (contact) with an inner wall 234 of the body 202. The second end 232 of the stabilizing arm 228 includes a contact member 236 with a radiused (curved) configuration. As seen in FIG. 1, for example, the stabilizing arm 228 defines a (first) transverse cross-sectional dimension (e.g., a thickness) T4 between the ends 230, 232 and the contact member 236 defines a (second) transverse cross-sectional dimension (e.g., a thickness) T5 that exceeds the transverse cross-sectional dimension T4, which serves to not only increase the strength of the stabilizing arm 228, but the surface area available for contact with the conduit 10*ii* (e.g., to further reduce wear on the conduit 10*ii*).

The clip 200 further includes at least one stem 238 (FIG. 2) that extends outwardly from the body 202. While the clip 200 is illustrated as including a pair of (e.g., first and second) stems 238*i*, 238*ii* that are (angularly) separated by (approximately) 90° in the particular embodiment seen throughout the figures (e.g., to facilitate connection of the clip 200 to a pair of tethers 100), the number of stems 238 may be increased or decreased in alternate embodiments without departing from the scope of the present disclosure. For example, embodiments of the clip 200 including a single stem 238 are also envisioned herein, as are embodiments including three stems 238.

The stem 238 is configured for rotatable engagement with the collar 104 such that the clip 200 is rotatable in relation to the tether 100 about the axis of rotation Y, which extends through the stem 238. In the illustrated embodiment, the stem 238 is fixedly (e.g., non-rotatably) connected to the body 202 of the clip 200 and is configured for removable, rotatable insertion into the collar 104, which allows for releasable engagement (e.g., disconnection and reconnection) of the clip 200 and the tether 100 as needed and rotation of the stem 238 within the collar 104 as the clip 200 is reoriented during connection to the conduit 10*ii*.

It is also envisioned, however, that the stem 238 may be rotatably connected to the body 202 of the clip 200. For example, in one embodiment, it is envisioned that the stem 238 and the collar 104 may be non-rotatably (e.g., fixedly) connected such that stem 238 and the collar 104 rotate in relation to the body 202 of the clip 200 in unison, whereas in another embodiment, it is envisioned that the stem 238 and the collar 104 may be configured for independent rotation in relation to the body 202 of the clip 200.

In the particular embodiment of the disclosure illustrated throughout the figures, the stem 238 and the collar 104 are configured such that the tether 100 and the clip 200 are relatively rotatable through an unlimited range of motion. Alternatively, however, it is envisioned that the system 1000 may be configured so as to limit relative rotation between the tether 100 and the clip 200 to a defined range of motion that lies substantially within the range of (approximately) 90° to (approximately) 360° (e.g., (approximately) 180°). For example, it is envisioned that the tether 100 (e.g., the collar 104) and the clip 200 (e.g., the stem 238) may include one or more corresponding stops (or other such suitable structures) to restrict relative rotation between the tether 100 and the clip 200.

To facilitate disconnection and reconnection of the tether 100 and the clip 200, the stem 238 and the collar 104 include corresponding engagement members 110, 240 (FIG. 5), respectively. In the illustrated embodiment, the engagement member 110 is configured as a (generally annular) groove 112 that extends into an inner surface 114 of the collar 104 and the engagement member 240 is configured as a (generally annular) rib 242 that extends outwardly from the stem 238 such that the rib 242 is removably insertable into the groove 112. To facilitate insertion of the rib 242 into the groove 112 and removal of the rib 242 from the groove 112 and, thus, connection and disconnection of the tether 100 and the clip 200, the rib 242 includes a (first, upper) chamfered surface 244 and a (second, lower) chamfered surface 246.

While the groove 112 and the rib 242 are configured for snap-fit engagement, it is envisioned that the engagement members 110, 240 may be configured in any manner suitable for the intended purpose of facilitating disconnection and reconnection of the tether 100 and the clip 200 as well as relative rotation between the tether 100 and the clip 200 in the manner described herein. For example, it is envisioned that the engagement member 240 may include a series of (ball) bearings or that the engagement member 240 may include one or more deformable (e.g., resilient) materials to allow for reconfiguration of the engagement member 240 (e.g., compression and expansion) during connection and disconnection of the tether 100 and the clip 200. More specifically, in one embodiment, it is envisioned that the engagement member 240 may be configured as an O-ring, a gasket, or the like.

To inhibit (if not entirely prevent) off-axis movement between the clip 200 and the tether 100 (e.g., lateral deflection of the stem 238 and/or the collar 104) in the directions indicated by arrows 3 (FIG. 2), the clip 200 includes a base 248 (FIG. 2) that is configured to support the stem 238 and the collar 104. In the illustrated embodiment, the base 248 is connected to (e.g., formed integrally with) the stem 238 and the stiffener 220 and extends laterally outwardly therefrom. More specifically, the base 240 defines a (first) notch 250 that is configured to receive the stiffener 220 such that the stiffener 220 extends through the base 240.

To further inhibit (if not entirely prevent) off-axis movement between the clip 200 and the tether 100, it is envisioned that the clip 200 may further include a support 252 (FIG. 2) that extends radially outward from the body 202 in transverse (e.g., (generally) orthogonal) relation to the stiffener 220. In the illustrated embodiment, the support 252 is connected to (e.g., formed integrally with) the body 202, the stiffener 220, and the base 248 such that the support 252 extends therebetween. More specifically, support 252 is received by a (second) notch 254 defined by the base 240, which is oriented in transverse (e.g., (generally) orthogonal) relation to the notch 250, such that the support 252 extends through the base 240.

While the clip 200 (e.g., the body 202, the appendages 208, the stiffener 220, the stabilizing arm 228, the base 248, the support 252, etc.) is illustrated as being unitary in construction (e.g., such that the appendages 208, the stiffener 220, the stabilizing arm 228, the base 248, and the support 252 are formed integrally with the body 202), embodiments are also envisioned in which one or more components of the clip 200 may be formed separately and connected to the body 202 (e.g., via ultrasonic welding, via one or more mechanical fasteners, via an adhesive, etc.).

With continued reference to FIGS. 1-5, use of the system 1000 will be discussed. In the particular embodiment of the disclosure illustrated throughout the figures, the tether 100 is initially connected to the conduit 10$i$ (e.g., by closing the body portion 102 of the tether 100 about the conduit 10), as seen in FIG. 1. The clip 200 can then be oriented and repositioned in relation to the tether 100 such that the channel 204 is (generally) aligned with the conduit 10$ii$. More specifically, during repositioning of the clip 200, the stem 238 rotates within the collar 104 about the axis Y until the channel 204 and the conduit 10$ii$ extend in (generally) parallel relation. The conduit 10$ii$ is then brought into engagement (contact) with the bearing surfaces 210$i$, 210$ii$ respectively defined by the appendages 208$i$, 208$ii$, thereby expanding the clip 200 (outwardly) along the axis X. As the clip 200 expands, the conduit 10$ii$ traverses the appendages 208$i$, 208$ii$ (e.g., the bearing surfaces 210$i$, 210$ii$), which guide the conduit 10$ii$ into the channel 204 and into engagement (contact) with the stabilizing arm 228. Continued advancement of the conduit 10$ii$ into the channel 204 deflects the stabilizing arm 228 radially outward in the direction indicated by arrow 1, which results in creation of the force F and engagement (contact) between the conduit 10$ii$ and the inner wall 234 of the body 202 so as to inhibit (if not entirely prevent) relative movement between the clip 200 and the conduit 10$ii$.

Upon complete insertion of the conduit 10$ii$ into the channel 204, due to the resilient construction of the clip 200 (and the resistance to deflection provided by the stiffener 220), the clip 200 returns to it's to its normal (non-expanded) configuration.

Following the respective connection of the tether 100 and the clip 200 to the conduits 10$i$, 10$ii$, as indicated above, the system 1000 improves organization, reduces wear on the clip 200 and the conduit 10$ii$, simplifies maintenance, and separates the conduits 10$i$, 10$ii$ from the engine to inhibit (if not entirely prevent) contact between the engine and the conduits 10$i$, 10$ii$ that may otherwise occur (e.g., during acceleration). Additionally, the system 1000 separates the conduits 10$i$, 10$ii$ from each other and inhibits (if not entirely prevents) relative movement therebetween to reduce wear that may otherwise be caused as a result of abrasion between the conduits 10$i$, 10$ii$.

In another method of use, the clip 200 is initially connected to the conduit 10$ii$ in the manner discussed above and the tether 100 is then repositioned in relation to the clip 200 to facilitate connection of the tether 100 to the conduit 10$i$. More specifically, during repositioning of the tether 100, the stem 238 is rotated within the collar 104 about the axis Y.

In another method of use the tether 100 is connected to the conduit 10$i$ and the clip 200 is connected to the conduit 10$ii$. The stem 238 can then be inserted into to the collar 104, during which, the tether 100 and the clip 200 are allowed to rotate in relation to each other via the rotatable engagement between the collar 104 and the stem 238.

Persons skilled in the art will understand that the various embodiments of the disclosure described herein and shown in the accompanying figures constitute non-limiting examples, and that additional components and features may be added to any of the embodiments discussed herein without departing from the scope of the present disclosure. Additionally, persons skilled in the art will understand that the elements and features shown or described in connection with one embodiment may be combined with those of another embodiment without departing from the scope of the present disclosure and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the disclosure, as are alternative embodiments that may result from combining, integrating, and/or omitting features from any of the disclosed embodiments.

Use of the term "optionally" with respect to any element of a claim means that the element may be included or omitted, with both alternatives being within the scope of the claim. Additionally, use of broader terms, such as "comprises," "includes," and "having," should be understood to provide support for narrower terms, such as "consisting of," "consisting essentially of," and "comprised substantially of." Accordingly, the scope of protection is not limited by the description set out above but is defined by the claims that follow and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated. For example, it is intended that the use of terms such as "approximately," "generally," and "substantially" should be understood to encompass variations on the order of 25% (e.g., to allow for manufacturing tolerances and/or deviations in design).

Although terms such as "first," "second," etc., may be used herein to describe various operations, elements, components, regions, and/or sections, these operations, elements, components, regions, and/or sections should not be limited by the use of these terms in that these terms are used to distinguish one operation, element, component, region, or section from another. Thus, unless expressly stated otherwise, a first operation, element, component, region, or section could be termed a second operation, element, component, region, or section without departing from the scope of the present disclosure.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. A system for use in securing one or more conduits in a vehicle, the system comprising:
   a clip configured for engagement with a first conduit; and
   a tether configured for engagement with a second conduit, the clip and the tether being rotatably engageable to facilitate rotation of the clip about an axis of rotation extending in generally orthogonal relation to the first conduit, wherein the clip and the tether are configured for releasable engagement to facilitate connection and disconnection of the clip and the tether.

2. The system of claim 1, wherein the clip includes a stem extending outwardly therefrom and the tether includes a collar configured to receive the stem such that the stem is rotatable within the collar.

3. The system of claim 2, wherein the stem and the collar are configured for releasable engagement such that the stem is connectable to the collar and disconnectable from the collar to thereby facilitate connection and disconnection of the clip and the tether.

4. The system of claim 3, wherein the stem and the collar are configured such that the clip is rotatable through an unlimited range of motion.

5. The system of claim 1, wherein the clip includes a stabilizing arm configured for engagement with the first conduit to inhibit relative movement between the clip and the first conduit.

6. The system of claim 5, wherein the stabilizing arm defines a length less than an inner transverse cross-sectional dimension defined by the clip.

7. The system of claim 5, wherein the stabilizing arm includes a first end connected to a body of the clip and a free second end.

8. The system of claim 5, wherein the stabilizing arm is configured for deflection such that the stabilizing arm applies a force to the first conduit during connection of the clip to the first conduit.

9. The system of claim 1, wherein the clip includes an appendage defining a bearing surface configured for engagement with the first conduit to thereby expand the clip during connection to the first conduit.

10. The system of claim 9, wherein the appendage defines an axis extending in non-orthogonal relation to the axis of rotation.

11. A system for use in securing one or more conduits in a vehicle, the system comprising:
    a clip including a body defining a channel configured to receive a first conduit, the body being configured for releasable and rotatable engagement with a tether securable to a second conduit such that the clip is rotatable about an axis of rotation extending transversely in relation to the first conduit.

12. The system of claim 11, wherein the clip further includes a stabilizing arm extending inwardly from the body, the stabilizing arm being configured to apply a force to the first conduit and thereby inhibit relative movement between the clip and the first conduit.

13. The system of claim 12, wherein the stabilizing arm is configured for deflection in relation to the body during connection of the clip to the first conduit.

14. The system of claim 13, wherein the clip further includes a stiffener extending from the body about a periphery thereof to resist deflection of the clip during connection to the first conduit.

15. The system of claim 14, wherein the clip further includes:
- a support extending between the body and the stiffener; and
- a base connected to the stiffener and the support to thereby inhibit off-axis movement between the clip and the tether.

16. The system of claim 15, wherein the stiffener and the support are oriented in generally orthogonal relation.

17. The system of claim 15, wherein the clip is unitary in construction.

18. A method of restricting movement between a first conduit and a second conduit in a vehicle, the method comprising:
- connecting a tether to the first conduit;
- rotating a clip in relation to the tether such that a channel defined by the clip extends in generally parallel relation to the second conduit; and
- connecting the second conduit to the clip to thereby secure the second conduit in relation to the first conduit.

19. The method of claim 18, further comprising connecting the clip to the tether.

20. The method of claim 19, wherein connecting the clip to the tether includes inserting a stem extending from the clip into a collar on the tether such that the stem is rotatable within the collar.

* * * * *